(12) United States Patent
Eberle et al.

(10) Patent No.: US 7,020,161 B1
(45) Date of Patent: Mar. 28, 2006

(54) PRESCHEDULING ARBITRATED RESOURCES

(75) Inventors: Hans Eberle, Mountain View, CA (US); Nils Gura, Ulm (DE)

(73) Assignee: Sun Microsystems, Inc., Palo Alto, CA (US)

(*) Notice: Subject to any disclaimer, the term of this patent is extended or adjusted under 35 U.S.C. 154(b) by 741 days.

(21) Appl. No.: 09/714,341

(22) Filed: Nov. 16, 2000

Related U.S. Application Data

(63) Continuation-in-part of application No. 09/540,779, filed on Mar. 31, 2000, and a continuation-in-part of application No. 09/540,729, filed on Mar. 31, 2000, now Pat. No. 6,882,649.

(51) Int. Cl.
H04J 3/16 (2006.01)
H04L 12/28 (2006.01)
G06F 15/173 (2006.01)
G06F 15/16 (2006.01)

(52) U.S. Cl. .................. 370/468; 370/398; 370/395.2; 709/226; 709/232

(58) Field of Classification Search ............ 370/395.4, 370/395.41, 395.42, 443, 444, 462, 398, 370/422, 380, 389, 400, 412, 390, 468, 395.21, 370/410, 432, 433, 447, 461, 442; 709/226, 709/232
See application file for complete search history.

(56) References Cited

U.S. PATENT DOCUMENTS

| | | | |
|---|---|---|---|
| 3,676,846 A | 7/1972 | Busch | |
| 4,648,029 A | 3/1987 | Cooper et al. | |
| 4,654,654 A | 3/1987 | Butler et al. | |
| 4,674,082 A | 6/1987 | Flanagin et al. | |
| 4,760,521 A | 7/1988 | Rehwald et al. | |
| 4,792,944 A * | 12/1988 | Takahashi et al. | 370/458 |
| 4,984,237 A | 1/1991 | Franaszek | |
| 5,042,032 A | 8/1991 | Dighe et al. | |
| 5,218,602 A | 6/1993 | Grant et al. | |
| 5,267,235 A | 11/1993 | Thacker | 370/60 |
| 5,301,279 A | 4/1994 | Riley et al. | |
| 5,359,320 A | 10/1994 | Jaffe et al. | |
| 5,467,211 A | 11/1995 | Haney et al. | |
| 5,500,858 A * | 3/1996 | McKeown | 370/412 |
| 5,517,495 A * | 5/1996 | Lund et al. | 370/399 |
| 5,539,747 A | 7/1996 | Ito et al. | |
| 5,544,163 A | 8/1996 | Madonna | |
| 5,550,815 A | 8/1996 | Cloonan et al. | |
| 5,560,016 A | 9/1996 | Fiebrich et al. | |
| 5,564,062 A | 10/1996 | Meaney et al. | |
| 5,566,171 A | 10/1996 | Levinson | |
| 5,566,182 A | 10/1996 | Gantner et al. | |

(Continued)

FOREIGN PATENT DOCUMENTS

EP 0 463 943 A2 1/1992
EP 0 507 044 A3 10/1992

(Continued)

OTHER PUBLICATIONS

IEEE Transactions on Parallel and Distributed Systems, vol. 4, No. 1 1993, "symmetric Crossbar Arbiters for VLSI Communication Switches", pp. 13-27.

(Continued)

*Primary Examiner*—Hanh Nguyen

(57) ABSTRACT

A system includes a plurality of resources and a plurality of requesters. A first portion of the resources are reserved for a particular time period in the system during a first arbitration phase, in response to prescheduling requests. During a second arbitration phase a second portion of the resources are allocated in response to regular requests, the first portion of the resources which are reserved being unavailable to the regular requests.

33 Claims, 11 Drawing Sheets

U.S. PATENT DOCUMENTS

| | | | |
|---|---|---|---|
| 5,577,035 A * | 11/1996 | Hayter et al. | 370/395.4 |
| 5,617,575 A | 4/1997 | Sakakibara et al. | |
| 5,684,961 A | 11/1997 | Cidon et al. | |
| 5,743,594 A | 4/1998 | Suskey et al. | |
| 5,771,229 A | 6/1998 | Gavrilovich | |
| 5,790,545 A | 8/1998 | Holt et al. | |
| 5,821,875 A | 10/1998 | Lee et al. | |
| 5,835,491 A | 11/1998 | Davis et al. | |
| 5,838,681 A * | 11/1998 | Bonomi et al. | 370/395.41 |
| 5,884,046 A | 3/1999 | Antonov | 395/200.68 |
| 5,954,799 A | 9/1999 | Goheen et al. | |
| 6,009,092 A | 12/1999 | Basilico | |
| 6,023,732 A | 2/2000 | Moh et al. | 709/232 |
| 6,029,217 A | 2/2000 | Arimilli et al. | |
| 6,034,954 A | 3/2000 | Takase et al. | 370/362 |
| 6,067,300 A | 5/2000 | Baumert et al. | |
| 6,069,573 A | 5/2000 | Clark, II et al. | |
| 6,072,772 A | 6/2000 | Charny et al. | |
| 6,111,886 A | 8/2000 | Stewart | |
| 6,115,373 A | 9/2000 | Lea | |
| 6,122,274 A | 9/2000 | Kumar | |
| 6,141,329 A | 10/2000 | Turner | |
| 6,160,812 A * | 12/2000 | Bauman et al. | 370/416 |
| 6,188,686 B1 | 2/2001 | Smith | |
| 6,198,749 B1 | 3/2001 | Hui et al. | |
| 6,208,653 B1 | 3/2001 | Ogawa et al. | |
| 6,212,194 B1 | 4/2001 | Hsieh | |
| 6,304,578 B1 | 10/2001 | Fluss | |
| 6,327,175 B1 | 12/2001 | Manapat et al. | |
| 6,336,156 B1 | 1/2002 | Chiang | |
| 6,345,050 B1 | 2/2002 | Alleyne et al. | |
| 6,370,148 B1 * | 4/2002 | Calvignac et al. | 370/412 |
| 6,404,756 B1 | 6/2002 | Whitehill et al. | |
| 6,449,283 B1 | 9/2002 | Chao et al. | |
| 6,473,103 B1 | 10/2002 | Bailey et al. | |
| 6,487,213 B1 | 11/2002 | Chao | |
| 6,553,027 B1 | 4/2003 | Lam et al. | |
| 6,567,428 B1 | 5/2003 | Rubin et al. | |
| 6,570,873 B1 | 5/2003 | Isoyama et al. | |
| 6,580,720 B1 | 6/2003 | Francis et al. | |
| 6,667,955 B1 | 12/2003 | Blanc et al. | |
| 6,728,243 B1 | 4/2004 | Jason, Jr. et al. | |
| 6,771,596 B1 * | 8/2004 | Angle et al. | 370/229 |

FOREIGN PATENT DOCUMENTS

| | | |
|---|---|---|
| EP | 0 868 054 A2 | 9/1998 |
| EP | 0 869 651 A1 | 10/1998 |
| EP | 1 096 387 A1 | 5/2001 |
| WO | WO 98/19439 | 5/1998 |
| WO | WO 99/26381 | 5/1999 |
| WO | WO 00/29956 | 5/2000 |

OTHER PUBLICATIONS

Watson, R. E. et al. "The Parallel I/O Architecture of the High-Performance Storage System (HPSS)", ISBN: 0-7803-3098-6, vol. SYMP. 14, Sep. 11, 1995, pp. 27-44.

Maltz, D. A. et al. "MSOCKS: An Architecture for Transport Layer Mobility", ISBN: 0-7803-4384-0, vol. 3, Mar. 29, 1998, pp. 1037-1045.

Working Draft, T11.1/Project 1245-D/Rev 1.9, "Information Technology—Scheduled Transfer Protocol (ST)", May 28, 1998, pp. 1-85.

Gruber, R. and Dubois-Pelerin Y. "Swiss-Tx: first experiences on the TO system", EPFL-SCR No. 10 (http://www.grid-computing.net/documents/article.pdf), Nov. 1998, 6 pages.

Brauss, S "Communciation libraries for the Swiss-Tx Machines", EPFL-SCR No. 11 (http://www.grid-computing.net/documents/article3.pdf), Nov. 1999, 6 pages.

Boden, Cohen et al., "Myrinet: A Gigabit-per-Second Local Area Network", IEEE 1995, pp. 29-36.

Tamir and Chi, "Symmetric Crossbar Arbiters for VLSI Communication Switches", IEEE Transactions on Parallel and Distributed Systems, vol. 4, No. 1, 1993, pp. 13-27.

Kronenberg, Levy et al., "VAXclusters: A Closely-Coupled Distributed System", ACM Transactions on Computer Systems, vol. 4, No. 2, May 1986, pp. 130-146.

Dally, William j., "Virtual-Channel Flow Control", IEEE 1990, pp. 60-68.

Chun, Mainwaring et al., "Virtual Network Transport Protocols for Myrinet", IEEE Micro, vol. 18, No. 1, 1998, pp. 53-63.

Pakin, Karamcheti et al., "Fast Messages: Efficient, Portable Communications for Workstation Clusters and MPPs", IEEE Concurrency, Apr.-Jun. 1997, pp. 60-73.

Karol, Hluchyj et al., "Input Versus Output Queueing on a Space-Division Packet Switch", IEEE Transactions on Communications, vol. COM-35, No. 12, Dec. 1987, pp. 1347-1356.

Scott and Thorson, "The Cray T3E Network: Adaptive Routing in a High Performance 3D Torus", HOT Interconnects IV, Stanford University, Aug. 15-16, 1996, pp. 1-10.

Mainwaring and Culler, "Design Challenges of Virtual Networks: Fast, General-Purpose Communciation", ACM SIGPLAN Symposium on Principles and Practice of Parallel Programming (PPOPP), Atlanta, GA, May 4-6, 1999.

Chun, Mainwaring et al., "Virtual network Transport Protocols for Myrinet", Computer Science Division Unviersity of California at Berkeley, Aug. 20, 1997, pp. 1-14.

Scott, Steven L., "Synchronization and Communication in the T3E Multiprocessor", Cray Research, Inc., 1996, pp. 26-36.

Mainwaring and Culler, "Active Message Applications Programming Interface and Communication Subsystem Organization", Draft Technical Report, Computer Science Division University of California at Berkeley, Technical Report UCB CSD-96-918, Oct. 1996, pp. 1-45.

Sun Microsystems, Inc., "The Sun Enterprise Clsuter Architecture Technical White Pater", 1997, pp. 1-74.

IBM, "JES2 Introduction", Third Edition, Sep. 1997, pp. 1-51.

ANSI, "Information Technology—Scheduled Transfer Protocol (ST)", T11.1/Project 1245-D/Rev. 3.6, Jan. 31, 2000, pp. 1-97.

Gruber, R. and Swaley, M-C "Swiss-Tx, un projet d'emtrepeneurs", EPFL Flash Informatique (EPFL-FI Online)! (http://sic.epfl.ch/SA/publications/FI98/fi-6-98/fi-6-98.pdf), Jul. 1998, 6 pages.

Kai Y. Eng, Michael G. Hluchyj, and Yu-Shuan Yeh, "A Knockout Switch for Variable-Length Packets," IEEE Journal on Selected Areas in Communications, vol. SAC-5, No. 9, Dec., 1987, pp. 1426-1435.

Martin Collier and Tommy Curran, "Path Allocation in a Three-Stage Broadband Switch with Intermediate Channel Grouping," INFOCOM '93, Proceedings Twelfth Annual Joint Conference of the IEEE Computer and Communications Societies, Networking: Foundation for the Future, IEEE, vol. 3, Mar. 28-Apr. 1, 1993, pp. 927-934.

Martin Collier and Tommy Curran, "Cell-Level Path Allocation in a Three-Stage ATM Switch," Communications, 1994, iCC 94, SUPERCOMM/ICC '94, Conference Record, Conference on Serving Humanity Through Communications, IEEE International, vol. 2, May 1-5, 1994, pp. 1179-1183.

* cited by examiner

| I | T | SLOT | RATE | LENGTH |
|---|---|------|------|--------|
| 0 | 2 | 1    | 2    | 3      |
| 1 | 3 | 1    | 0    | 1      |
| 1 | 2 | 5    | 4    | 5      |

FIG. 4

| SLOT | PRECALC SCHEDULE $I_0$ | PRECALC SCHEDULE, $I_1$ |
|------|------------------------|-------------------------|
| 0    | 0000                   | 0000                    |
| 1    | 0010                   | 0001                    |
| 2    | 0000                   | 0000                    |
| 3    | 0010                   | 0000                    |
| 4    | 0000                   | 0000                    |
| 5    | 0010                   | 0000                    |

FIG. 5

| I | T | SLOT |
|---|---|---|
| 0 | 2,3 | 1 |
| 1 | 1,2,3 | 2 |
| 2 | 1,3 | 1 |

FIG. 6

| SLOT | PRECALC SCHEDULE $I_0$ | PRECALC SCHEDULE, $I_1$ | PRECALC SCHEDULE, $I_2$ |
|---|---|---|---|
| 0 | 0000 | 0000 | 0000 |
| 1 | 0011 | 0000 | 0000 |
| 2 | 0000 | 0111 | 0000 |

FIG. 7

| SLOT | PRECALC SCHEDULE $I_0$ | PRECALC SCHEDULE, $I_1$ | PRECALC SCHEDULE, $I_2$ | PRECALC SCHEDULE, $I_3$ |
|---|---|---|---|---|
| 0 | 0111 | 1001 | 0000 | 0000 |
| 1 | 0000 | 1001 | 1110 | 0000 |
| 2 | 1100 | 0011 | 0000 | 0000 |

|  T<br>I | 0 | 1 | 2 | 3 |
|---|---|---|---|---|
| 0 | 0 | 0 | 0 | 0 |
| 1 | 0 | X | X | 0 |
| 2 | 0 | 0 | 1 | 1 |
| 3 | 0 | 0 | 0 | 0 |

◯ ROUND ROBIN POS.
× GRANTED REQUEST

FIG. 10

|  T<br>I | 0 | 1 | 2 | 3 |
|---|---|---|---|---|
| 0 | 0 | 1 | 1 | 1 |
| 1 | 0 | 0 | 0 | 0 |
| 2 | 0 | 0 | 0 | X |
| 3 | 0 | 0 | 0 | 0 |

◯ ROUND ROBIN POS.
⬭ PRESCHEDULED RESOURCE
× GRANTED REQUEST

FIG. 11

PRESCHEDULING ARBITRATED RESOURCES

RELATED APPLICATIONS

This application is a continuation-in-part of U.S. patent application Ser. No. 09/540,779, filed Mar. 31, 2000, entitled "DATA NETWORK WITH INDEPENDENT TRANSMISSION CHANNELS," naming as inventors Hans Eberle, Neil C. Wilhelm and Nils Gura; and U.S. patent application Ser. No. 09/540,729, filed Mar. 31, 2000 now U.S. Pat. No. 6,882,649, entitled "LEAST CHOICE FIRST ARBITER," naming as inventors Nils Gura and Hans Eberle, which applications are incorporated herein by reference in their entirety.

COPYRIGHT NOTICE

A portion of the disclosure of this patent contains material which is subject to copyright protection. The copyright owner has no objection to the facsimile reproduction by anyone of the patent document or the patent disclosure, as it appears in the U.S. Patent and Trademark Office patent files or records, but otherwise reserves all copyright rights whatsoever.

BACKGROUND OF THE INVENTION

1. Field of the Invention

The present invention relates to electronic systems and more particularly to scheduling and allocation of resources within such a system.

2. Description of the Related Art

Systems having shared resources are common. One example of such a system is a computer network in which computing devices such as workstations, personal computers, servers, storage devices, firewalls and other computing devices function as nodes of a network with at least one network element connecting the computing devices. The various nodes transmit and/or receive various kinds of information over the network, typically in packets.

The rules by which nodes transmit and receive packets are defined in various protocols. A network protocol provides rules to route a packet of information from a source to a destination. A packet is generally a portion of a message transmitted over a network that typically includes routing or destination information in addition to data information. Packets may vary in size from only a few bytes to many thousands of bytes.

In a switched network, congestion arises when a shared resource such as a path, internal or external to the switch, is requested to forward more packets than its capacity allows. In switched networks (and other systems) an arbiter may be used to schedule usage of the shared resources to prevent conflicts resulting from requests for simultaneous access to the same shared resource. One example of such a system having shared resources susceptible to conflicts is a network switch having multiple input ports and multiple output ports in which input ports make requests for connection to the output ports. Each requester or input port sends a request for an output port (or sends a set of requests for multiple output ports) to an arbiter.

A conflict arises when a particular output port is requested by multiple input ports at the same time (assuming an output port can be allocated to only one input port at a time). To deal with the conflict, an arbitration decision awards the output port to one of the requesters. The arbiter chooses the winner such that resources (the output ports) are allocated to requesters in a conflict-free way. Thus, certain requests are serviced by being granted an output port and certain requests may be left unserviced in that they are denied an output port. However, the choice of which requests to grant may lead to under-utilization of the resources since some requests may be denied.

Another example of a system having shared resources is a computer system in which multiple processors are coupled to multiple memories. Assume that each processor has access to all of the memories and each memory can only be accessed by one processor at a time. When multiple processors request access to the same memory at the same time, an arbitration decision has to be made as to which processor gets to access the memory in question.

One type of traffic that can be found on systems described above is isochronous traffic. Isochronous traffic has time constraints requiring the isochronous data to be delivered within a certain time. For example, a video stream needs to be delivered in time to be displayed on a screen without delay negatively affecting video image quality. Unfortunately, many existing systems are optimized for asynchronous traffic rather than for the requirements of isochronous traffic. Because of the time constraints, isochronous transfers add increased scheduling complexity in a system in which an arbiter allocates resources.

Multicast transfers, which use one to many communication in which a single source communicates with multiple targets simultaneously, provide efficiency since such transfers save network bandwidth and reduce the time to execute the multicast. However, such transfers can also add increased scheduling complexity, particularly in a system that mainly supports unicast operations. That increased complexity arises in part because multicast requires that multiple resources be available simultaneously.

Accordingly, it would be desirable to provide a way to more easily deal with scheduling complexities associated with isochronous traffic and/or multicast traffic in a system requiring arbitration for resources.

SUMMARY OF THE INVENTION

Accordingly, in a first aspect of the invention, a method for allocating a plurality of resources in a communication network includes reserving a first portion of the resources for a particular time period on the network during a first arbitration phase, in response to prescheduling requests. During a second arbitration phase a second portion of the resources are allocated for the particular time period in response to regular requests. Data is transferred across the communication network according to the allocating of resources.

In accordance with another aspect of the invention a network system is provided that includes a data transport medium attached to a plurality of sources and a plurality of targets. The system includes an arbiter coupled to receive first requests for transfers from one or more of the sources to one or more of the targets during a time slot on the data transport medium. The arbiter is further coupled to receive regular requests from the sources for transfers from one or more of the sources to one or more of the targets during the time slot. The arbiter allocates the targets to the sources in accordance with the first requests and then in accordance with the regular requests. The first requests may come in the form of a precalculated schedule.

In accordance with still another aspect of the invention a method is provided for allocating a plurality of resources in an electronic system. The method includes allocating a first group of one or more of the resources in accordance with first requests for the resources, the first group being allocated for a particular time period; and subsequently allocating a second group of one or more of the resources for the particular time period, the first and second group of resources being mutually exclusive.

BRIEF DESCRIPTION OF THE DRAWINGS

The present invention may be better understood, and its numerous objects, features, and advantages made apparent to those skilled in the art by referencing the accompanying drawings in which the use of the same reference symbols in different drawings indicates similar or identical items.

FIG. 4 illustrates requests for prescheduled slots for isochronous or other periodic data.

FIG. 5 illustrates a conflict free schedule generated in response to the requests shown in FIG. 4.

FIG. 6 illustrates requests for prescheduled slots for multicast data.

FIG. 7 illustrates a conflict free schedule generated in response to the requests shown in FIG. 6.

FIG. 10 illustrates operation of an arbiter allocating prescheduled requests.

FIG. 11 illustrates allocating regular requests following allocation of the prescheduled requests in FIG. 10.

DESCRIPTION OF THE PREFERRED EMBODIMENT(S)

Figure 1:
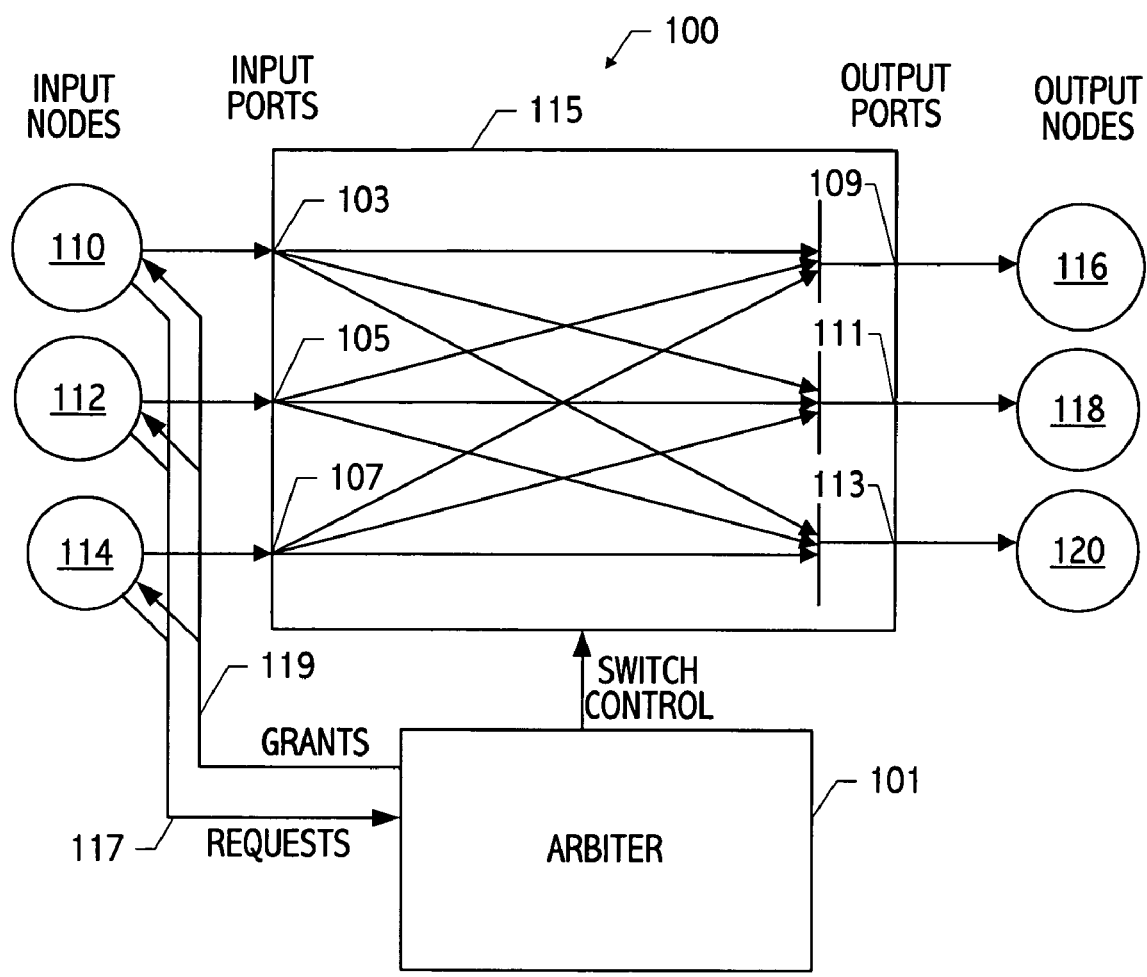
FIG. 1 shows a network system including a network switch that can advantageously be scheduled according to one or more embodiments of the present invention.

Referring to FIG. 1, a network 100 is illustrated that has resources that can advantageously be scheduled according to one or more embodiments of the present invention. More particularly, arbiter 101 schedules usage of shared resources, i.e., the data paths connecting input ports 103, 105 and 107 to output ports 109, 111 and 113 in switch 115. Each input node 110, 112, 114 is connected to a corresponding input port. Since multiple requesters, i.e., multiple input nodes, can simultaneously request a shared resource, i.e., a connection to an output port, arbiter 101 allocates data paths through the network. The arbiter tries to connect input and output ports in such a way that as many packets as possible can be forwarded simultaneously, thus maximizing usage of shared resources. Each requester sends a set of requests to arbiter 101, which then chooses the requests to be granted such that resources are allocated to requesters in a conflict-free way. When input and output nodes communicate with arbiter 101, they are referred to as initiator and target, respectively. In a typical system, a node combines both an input node and an output node.

In one embodiment of the invention, arbiter 101 simultaneously receives request signals 117 for shared resources from the various input nodes 110, 112 and 114. Scheduling happens synchronously in that grant signals 119 are sent simultaneously and the usage interval for each resource has the same length. Scheduling may be further constrained in that only one requester can use a particular resource at the same time. The main goal of an arbitration scheme typically is to achieve high aggregate usage of the resources while still providing a minimum level of fairness, so that the arbitration scheme avoids starvation of individual requests.

There are many different arbitration schemes that arbiter 101 can implement to allocate data paths through the switch. For example, arbiter 101 can allocate the data paths by prioritizing requests from nodes based on the number of their requests. In such a scheme, highest priority is given to the requester with the fewest number of outstanding requests, and the lowest priority is given to the requester with the highest number of outstanding requests. Resources are scheduled one after the other in that a resource is allocated to the requester with the highest priority first. That way requests from the requester having the fewest choices are chosen first to be allocated. Thus, in such an embodiment, priority is inversely related to the number of requests being made. Requesters with many requests have more choices than requesters with few requests and, therefore, can be considered later and still have a reasonable likelihood of being granted one of their outstanding requests. That strategy increases the number of granted requests and results in higher aggregate usage of system resources when compared with other arbitration schemes.

In another embodiment, the arbitration scheme may allocate output ports based on the number of requests being made for a particular output port. Those output ports with the fewest requests are allocated first. A round robin scheme can also be used by the arbiter to avoid starvation in conjunction with those embodiments. Further details on an arbiter which may be used in some or all of the embodiments described herein, can be found in the patent application entitled "Least Choice First Arbiter", previously mentioned. Of course, one of ordinary skill would understand that many other arbitration schemes are known in the art and may be utilized in the various embodiments described herein.

Figure 2:
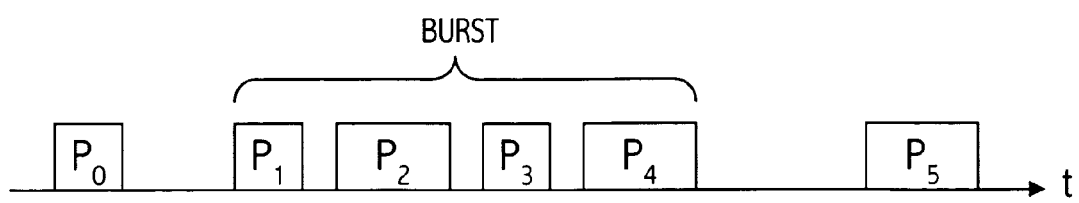
FIG. 2 illustrates asynchronous or bursty traffic typically found on a network.

Network 100 typically carries several different kinds of data traffic. Referring to FIG. 2, one kind of traffic that is commonly carried in such data networks is asynchronous traffic. Asynchronous traffic tends to occur in bursts. Thus, as shown in FIG. 2, packet $P_0$ is followed by a burst of packets $P_1$–$P_4$ which are then followed after an interval by $P_5$. Usage of network resources by such traffic is usually unpredictable. Many existing systems are optimized for such bursty traffic.

Figure 3:
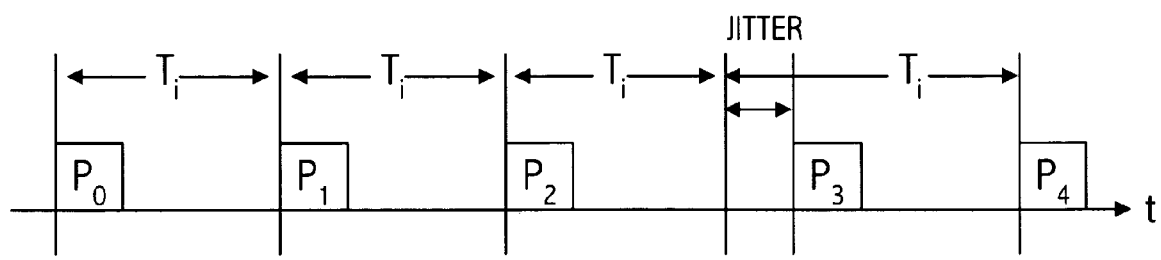
FIG. 3 illustrates periodically scheduled isochronous traffic.

Another kind of traffic network 100 typically carries is isochronous traffic, which may require that data packets be transferred at a fixed rate with as little jitter as possible. Referring to FIG. 3, an example of such isochronous traffic is illustrated. Examples of such traffic include audio data, video data and animated graphics. Each isochronous packet needs to be received within time period $T_i$. If not, jitter results, as is the case for packet $P_3$, possibly resulting in degradation of video or audio quality.

As previously mentioned, scheduling isochronous and/or multicast data can be burdensome for an arbiter optimized for unicast and/or asynchronous, non-periodic types of data transfers. In order to better deal with certain categories of data transfers such as data transfers involving isochronous data or multicast data according to an embodiment of the present invention, a precalculated schedule is established before the arbiter 101 arbitrates the "regular" requests, e.g., for asynchronous requests. The precalculated schedule may be calculated by one of the nodes in the form of a centralized scheduler or by all the nodes in the form of a distributed scheduler. In a distributed scheduler, scheduling can be distributed by having each output node manage the output port it is connected to.

The precalculated schedule may be used to schedule isochronous data to implement quality of service (QoS), e.g., transmission of audio or video streams across a network. The source of the stream, e.g., an input node in network 100, asks the scheduler to periodically reserve a switch slot. Assume that switch 115 is a synchronous switch that changes settings of the switching fabric periodically (the period being called a slot). A precalculated schedule can accommodate isochronous traffic by allocating the necessary connection between an input and output port at intervals derived from the rate of the isochronous data stream. That way, an appropriate amount of switch bandwidth can be reserved. For example, if B is the port or link bandwidth and b the bandwidth needed to transfer the isochronous data stream, the precalculated schedule has to reserve one slot every B/b slots. For example, if the link bandwidth is 2.5 Gbits/s and the stream requires a bandwidth of 2.5 Mbits/s, the source of the stream asks the scheduler to reserve 1 out of every 1000 slots. The slots can be reserved far in advance, possibly for the whole duration of the transfer and before the transfer is started.

In an embodiment, the precalculated schedule may be communicated to the arbiter 101 with the help of request packets. For every slot on the switch, the arbiter receives one request packet containing regular requests from every node. That request packet may contain an additional vector of prescheduled targets as described further herein. The arbiter uses that information in that the arbiter does not allocate to regular requests output ports that are reserved by the precalculated schedule. That can be accomplished by the arbiter allocating the precalculated schedule as received or preferentially scheduling those requests that are indicated to be prescheduled requests.

Another type of traffic that may be carried over network 100 (FIG. 1) is multicast data which uses multiple communications paths between one input port and multiple output ports. Thus, referring to FIG. 1, input port 103 may be coupled to send data to multiple ones of the output ports 109, 111 or 113. While multicast data can always be sent sequentially, it is more efficient to transfer multicast data in parallel since it saves network bandwidth and reduces the time needed to execute the multicast. However, multicast can be difficult to implement in a system that more generally supports unicast operations. One difficulty is resource allocation since multicast requires multiple resources to be available simultaneously. Another complication arises with request-acknowledge protocols needed for reliable communication. More specifically, to determine that a multicast packet was successfully delivered, the source of the multicast needs to collect an acknowledge from every destination that was addressed by the multicast packet. One solution to that problem is described in U.S. application Ser. No. 09/659,106 entitled, "Reliable Multicast Using Merged Acknowledgements", filed Sep. 11, 2000, naming Hans Eberle and Nils Gura as inventors.

An embodiment of the present invention uses a centralized scheduler implemented in software to generate the precalculated schedule, which is then sent to the arbiter. The scheduler runs on one of the nodes connected to the network. The scheduler collects requests from the other nodes to reserve slots on the network. Based on the requests and the existing allocations, a precalculated schedule is generated. A simple scheduling policy may consider requests on a first-come, first-serve basis and grant a request if the corresponding slots are available on the network. Another scheduling policy tries to maintain some degree of fairness by allocating equal shares of the switch bandwidth to each host.

After being generated in the centralized scheduler, the precalculated schedule is communicated to the nodes from the centralized scheduler such that for every slot, the nodes can inform the arbiter about the connections which have been prescheduled. Although the precalculated schedule is required to be conflict-free in one embodiment, the arbiter may still check to ensure that an output port connects to only one input port, and if necessary, drop conflicting connections. In that way, any errors that are present in the prescheduled transfers can be corrected. If the system does not provide a conflict-free precalculated schedule, the conflicts in the schedule can be resolved by the central arbiter. Once the pre-allocated slots are determined, the remaining output ports can then be scheduled by the arbiter.

Figure 14:
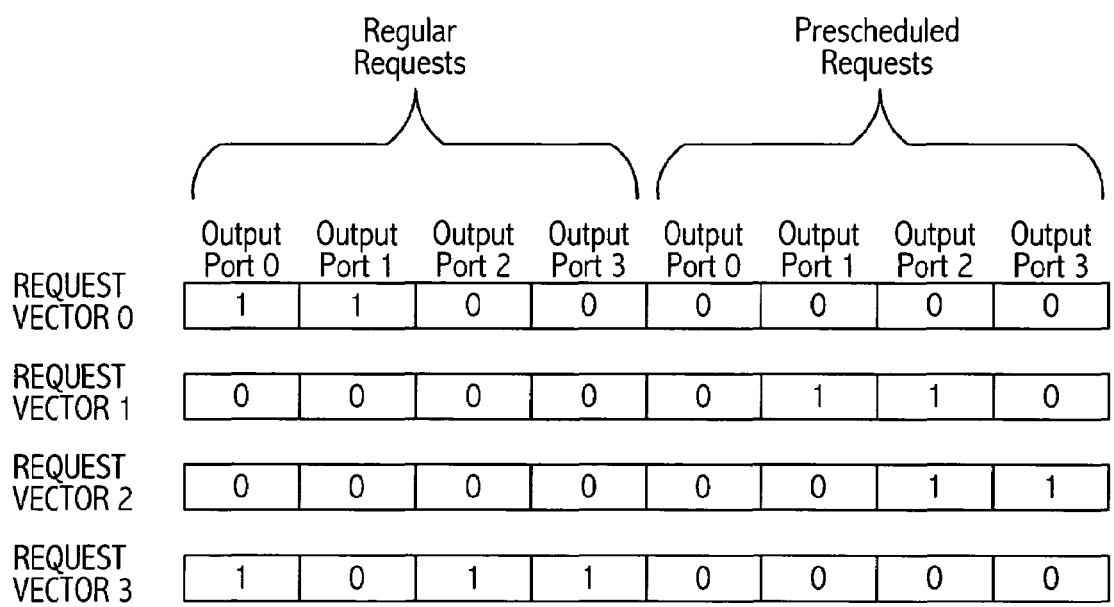
FIG. 14 illustrates a vector being sent to a central arbiter containing both prescheduled and regular requests.

In one embodiment the software scheduler distributes the precalculated schedule to the nodes, which in turn send the corresponding "prescheduled requests" together with their "regular requests" to the centralized arbiter (see FIG. 14).

A precalculated schedule can also be used to schedule multicast packets. To make that possible, the precalculated schedule specifies multipoint connections, in which multiple output ports are connected to the same input port. Implementing multicast with the help of a software prescheduler rather than the hardware arbiter is attractive since multicast connections constrain scheduling and therefore can be more easily handled in software.

Referring to FIG. 4 and FIG. 5, an example of prescheduling isochronous data transfers is shown. In FIG. 4 two initiators $I_0$ and $I_1$ are requesting connection to targets $T_2$ and $T_3$ during various time slots on the network. More particularly, initiator $I_0$ is requesting a connection to target $T_2$ during slot 1. A slot is a time period on switch 115 during which a particular input port is connected to an output port. Additionally, the request by $I_0$ includes a rate 2 and a length 3. The rate and length numbers are indicative of the periodicity of the request, which is explained more fully with relation to FIG. 5. Initiator $I_1$ is requesting connection to target $T_3$, i.e., output port 3, during slot 1. The request includes a rate of 0 and a length of 1. In addition, initiator $I_1$ is requesting connection to target $T_2$ during slot 5 with a rate of 4 and a length of 5.

FIG. 5 shows the conflict-free schedule that results after the requests in FIG. 4 are sent to a software scheduler executing in one of the nodes coupled to switch 115. FIG. 5 shows the precalculated schedule for source $I_0$ with respect to targets $T_0$, $T_1$, $T_2$ and $T_3$, and the precalculated schedule, in the next column, for source $I_1$ with respect to targets $T_0$, $T_1$, $T_2$ and $T_3$. During slot 0, no requests for precalculated slots were made and no slots are shown as allocated. During slot 1, the "0010" value in the $I_0$ column corresponding to slot 1, indicates that source $I_0$ is scheduled to be connected to target $T_2$. During slot 3 and slot 5, target $T_2$ is also allocated to $I_0$. That is because the request included a rate of 2, meaning it was to be repeated every two slots, and a length of 3, meaning that it was to be repeated for a total of 3 slots. Thus, the request shown in FIG. 4 by source $I_0$ requested connections to target $T_2$ during slots 1, 3 and 5.

The "0001" in the $I_1$ column corresponding to slot 1 indicates that source $I_1$ is scheduled to be connected to target $T_3$. The rate of 0 and length of 1 shown in FIG. 4 indicates that the request is not a periodic request as was the request by $I_0$. Slot 2 has all 0 entries since neither of the sources requested targets during that period. Referring again to FIG. 4, the second request by initiator or source $I_1$ for target $T_2$ during slot 5 is shown as shaded because it was not scheduled due to a conflict with the periodic request by initiator $I_0$. Thus, either the conflicting request is dropped entirely or it is scheduled after slot 5. That determination can be made based on system implementation, and factors such as the type of traffic requesting the slot.

Referring to FIGS. 6 and 7, illustrated are prescheduled requests and a resulting schedule for pre-allocated multicast transfers from sources $I_0$, $I_1$ and $I_2$ to targets $T_1$, $T_2$ and $T_3$. In the example shown in FIGS. 6 and 7, the schedule generated is conflict free. Referring to FIG. 6, initiator $I_0$ is requesting connection to two targets, $T_2$ and $T_3$, during slot 1. Initiator $I_1$ is requesting connection to three targets, $T_1$, $T_2$ and $T_3$, during slot 2, and initiator $I_2$ is requesting connection to targets $T_1$ and $T_3$ during slot 1. The request by initiator $I_2$ is shaded to indicate that that request is not scheduled by the scheduler due to a conflict with the request by initiator $I_0$ since both are requesting the path to target $T_3$ during the same slot. In the example given, the scheduler gives priority to the request by $I_0$. The request by initiator $I_2$ may be delayed rather than canceled.

Referring to FIG. 7, an exemplary precalculated schedule is illustrated that is generated in response to the requests shown in FIG. 6. During slot 0, since there were no requests, no transfers are scheduled. During slot 1, initiator $I_0$ is shown in the $I_0$ column as being scheduled for connection to targets $T_2$ and $T_3$ as indicated by the "0011". All other entries for slot 1 are 0. For slot 2, the precalculated schedule shows that initiator $I_1$ is scheduled to be connected to targets $T_1$, $T_2$ and $T_3$, as requested.

The schedules shown in FIG. 5 and FIG. 7 are non-conflicting schedules, which are provided to an arbiter such as arbiter 101 (FIG. 1) after they are generated, so that the arbiter can know which of the resources have been pre-allocated. The arbiter then continues with arbitration of the "regular" requests, i.e., the non-pre-allocated requests, to allocate the remaining resources. Since those resources that are pre-allocated are not available, they are not considered; the pre-allocated requests are essentially given priority by the arbiter. The "regular" requests in one typical network are requests for asynchronous transfers, but they are not limited to such transfers.

Figures 8, 9:
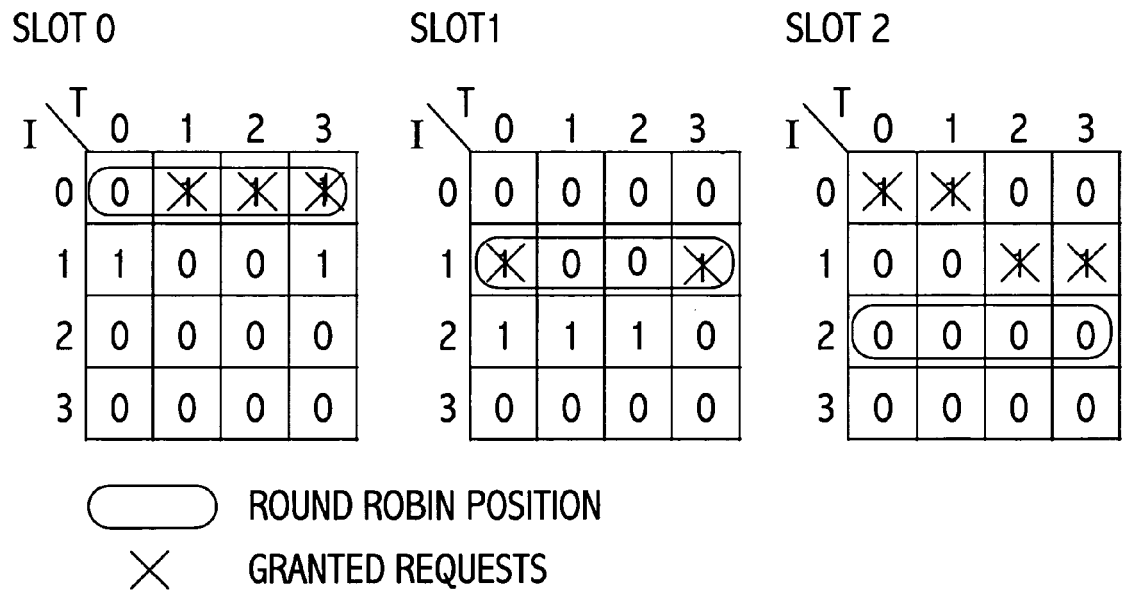
FIG. 8 illustrates conflicting prescheduled requests in a system having four requesters and four resources.
FIG. 9 illustrates operation of an exemplary arbitration scheme to allocate the resources in a conflict free and fair manner.

In other embodiments, the scheduler may not generate a conflict-free schedule for the various pre-allocated requests. FIG. 8 shows the requests by requestors $I_0$, $I_1$, $I_2$ and $I_3$ for connection to targets $T_0$, $T_1$, $T_2$ and $T_3$ during slots 0, 1 and 2. The targets are represented by binary digits in the columns as shown by the "0111" in the $I_0$ column in FIG. 8. In slot 0, the requestor $I_0$ is requesting connection to targets $T_1$, $T_2$ and $T_3$. In slot 2, requestor $I_0$ is also requesting connection to targets $T_0$ and $T_1$. Requestor $I_1$ is requesting connection during slot 0 to targets $T_0$ and $T_3$. Requestor $I_1$ is also requesting connection during slot 1 to $T_0$ and $T_3$. Requestor $I_1$ is also requesting connection to targets $T_2$ and $T_3$ during slot 2. Requestor $I_2$ is requesting connection during slot 1, to targets $T_0$, $T_1$ and $T_2$. Because certain of those requests conflict, an arbitration scheme must be utilized to determine which of the requests are going to be granted.

Referring to FIG. 9, operation of an exemplary arbitration scheme is illustrated. The initiators I and targets T are shown in an array in which the requests for a target are indicated by 1 in the array location corresponding to the request. Thus, for slot 0, location [0,1] is shown having a 1 to indicate that initiator $I_0$ is requesting target $T_1$ during slot 0. In order to determine which of the initiator's requests are considered first, a round robin approach may be utilized. In the exemplary embodiment shown, a round robin scheme is utilized in which the requests of the initiator designated by the round robin row are considered first. In FIG. 9, the current round robin row for arbitrating the requests for slot 0 is assumed to be initiator $I_0$. Because $I_0$ has requests for targets $T_1$, $T_2$ and $T_3$, those requests are granted as indicated by the X in those positions. In contrast, the requests by initiator $I_1$ for targets $T_0$ and $T_3$ do not have Xs, indicating that those requests were not granted.

In arbitrating the requests for slot 1, the round robin row has moved to initiator $I_1$ and thus any requests by $I_1$ are considered first. Because $I_1$ has requests for $T_0$ and $T_3$ in slot 1, those requests are granted as indicated by the X at positions [1,0] and [1,3].

The requests for slot 2 are arbitrated as follows: the round robin row for slot 2 dictates that the requests by $I_2$ be considered first. Since there are no requests by $I_2$ for targets in slot 2, the requests subsequently considered are by $I_3$, $I_0$ and $I_2$ respectively. The requests by $I_0$ for targets $T_0$ and $T_1$ and the requests by $I_1$ for targets $T_2$ and $T_3$ are granted.

While not shown in the examples in FIGS. 6, 7, 8 and 9, multicast transfers can also be scheduled periodically as were exemplary isochronous transfers in FIGS. 4–5. Thus, a multicast requestor may request, e.g., that it be connected to three targets every five slots for a duration of ten total slots. If such a request were granted, every fifth slot of the next 50 slots would be allocated to that periodic multicast request.

Referring to FIGS. 10 and 11, operation of a two phase arbitration scheme for multicast transfers according to one embodiment of the present invention is shown. FIG. 10 illustrates generation of a pre-calculated schedule in a first phase, and FIG. 11 shows scheduling of "regular requests" in a second phase. In FIG. 10, it can be seen that initiators $I_1$ and $I_2$ have requests for targets $T_1$ and $T_2$, and $T_2$ and $T_3$, respectively. As can be seen, the requests for $T_2$ conflict. Accordingly, the arbiter has to allocate the resources to only one of the requests. Using a round robin scheme, in the first phase, the arbiter first checks the requests at the round robin location, in this example the round robin row is $I_1$. Because $I_1$ has requests for resources $T_1$ and $T_2$, those requests are granted as indicated by the X at locations [1,1] and [1,2]. Since $I_2$ has a request for target $T_2$ that conflicts with a granted request of $I_1$, all of the requests of $I_2$ are ignored. Thus, the pre-calculated schedule allocates targets $T_1$ and $T_2$ to requestor $I_1$ for that particular slot.

In the second phase, the central arbiter schedules the regular requests as shown in FIG. 11. The resources $T_1$ and $T_2$ granted to precalculated requests as shown in FIG. 10 are shown in dashed lines in FIG. 11 indicating that they are unavailable for allocation. In the exemplary second phase illustrated, the arbiter starts evaluating requests at the round robin position [1,1] indicated by the circle at that position, which happens to be unavailable since $T_1$ was allocated to a precalculated request. Next, the arbiter evaluates requests for $T_2$. Again, $T_2$ was allocated to a precalculated request and no further scheduling decision needs to be made. The arbiter now moves on to scheduling $T_3$. Both $I_0$ and $I_2$ are requesting $T_3$. Since $I_2$ has fewer requests than $I_0$, $I_2$ is given priority and the request in position [2,3] is granted as indicated by the X. Note that in this embodiment all regular requests shown in FIG. 11 are considered when calculating the priorities of the initiators. An alternative embodiment only considers regular requests for resources that have not been granted either to a prescheduled request or to a regular request. In an embodiment (not shown in FIGS. 10 and 11), to avoid interference with the fairness guarantees provided when scheduling "regular" requests, the precalculated scheduler does not consider a request in the column with the round robin position of FIG. 11. In that embodiment, broadcasts including all targets are not possible. In yet another embodiment, the round robin position of FIG. 11 is not moved if the target that the round robin position points to was granted to a prescheduled request.

Figure 12:
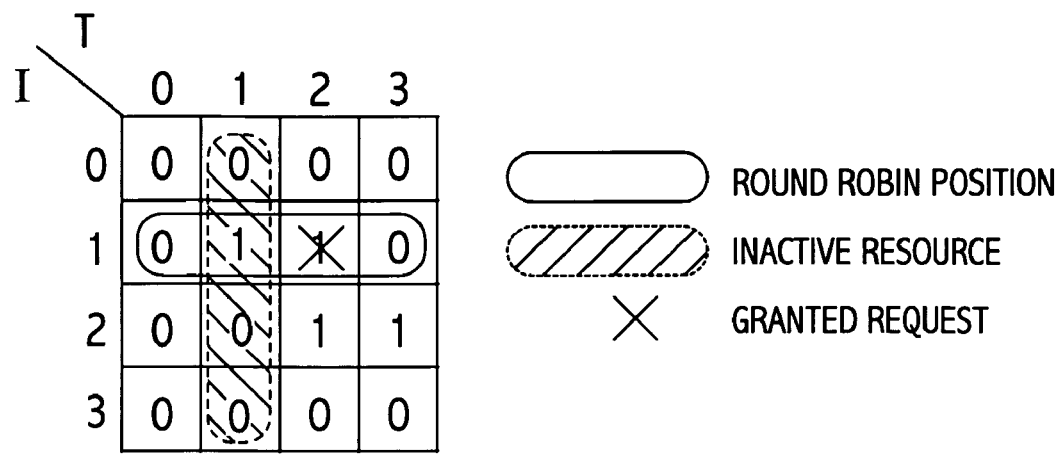
FIG. 12 illustrates operation of an arbiter allocating prescheduled requests in which one of the resources is inactive.

Referring to FIG. 12, the first phase of another two phase arbitration embodiment is illustrated in which the targets may be inactive and thus not allocable. For example, targets are declared inactive by the arbiter 101 if the arbiter does not receive a configuration packet from the node indicating the node is active. Nodes are expected to send a configuration packet every arbitration cycle to indicate which targets they are requesting. In FIG. 12, the target $T_1$ is inactive and unavailable. Thus, the request by $I_1$ for target $T_1$ shown in FIG. 12 at [1,1] is not granted because target $T_1$ is inactive. In a manner similar as that described with relation to FIG. 10, the round robin row is at $I_1$ and thus, the requests by initiator $I_1$ are considered first, resulting in the request at [1,2] being granted as indicated by the X at that position. Thus, a pre-calculated schedule is determined that grants target $T_2$ to requestor $I_1$.

Figure 13:
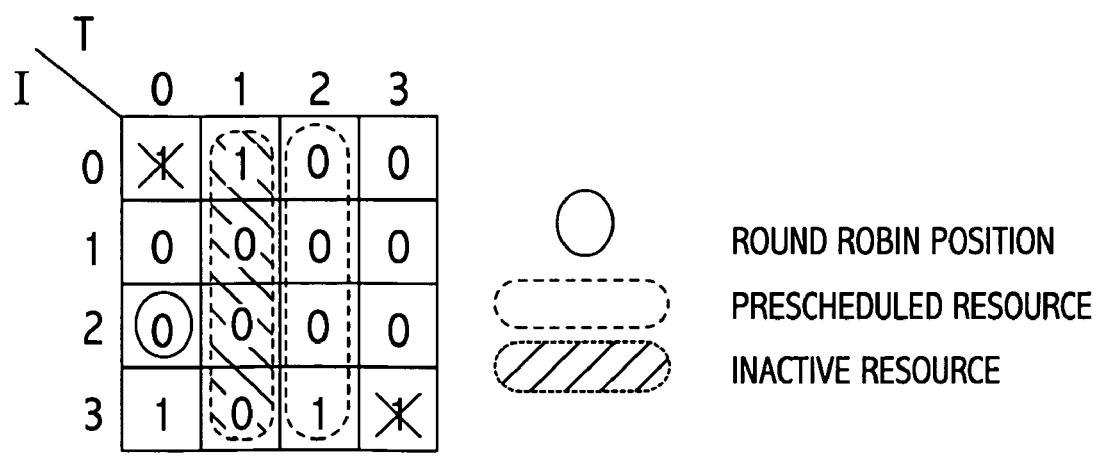
FIG. 13 illustrates allocating regular requests following allocation of the prescheduled requests shown in FIG. 12.

Referring to FIG. 13, the operation of the arbiter to schedule the regular requests is illustrated. Target $T_1$ is illustrated as an inactive resource. Target $T_2$ is marked as a prescheduled resource, and thus unavailable since that target was allocated to $I_1$ in the pre-allocated schedule. The arbiter begins at the round robin position [2,0] indicated by the circle at that position. As can be seen by the 0 at that position there is no request. The arbiter then proceeds to determine the remaining requests for that target. The requests that are active for that target are the requests at [0,0] and [3,0]. Since $I_0$ has fewer requests than $I_3$, it is given priority and $T_0$ is allocated to $I_0$. $T_3$ is the last resource to be scheduled. There is only one request at [3,0] to be considered. It is granted and $T_3$ is allocated to $I_3$.

The requests for prescheduled slots can be provided to the centralized scheduler residing in one of the hosts through packets including the information such as that shown in FIG. 4 or 6. Referring to FIG. 14, an exemplary set of vectors illustrating regular and prescheduled requests provided directly to the central arbiter such as 101 is shown. The requests correspond to the prescheduled and regular requests made in FIGS. 12 and 13.

While some embodiments of the invention may utilize a hardware centralized arbiter for scheduling regular requests and a software scheduler for scheduling prescheduled requests, other embodiments may employ entirely hardware or entirely software arbiters, or a mixture of the two according to system requirements. Operation of an exemplary centralized arbiter is illustrated in the software listing in Appendix A. Array P indicates whether a requester (also referred to herein as a source or initiator) has a prescheduled connection with a resource (also referred to herein as a target). Procedure arbitrate determines if the prescheduled requests have any conflicts and provides a conflict free allocation of resources. Array P may be generated by a scheduler in one of the nodes and may already be conflict free. The procedure then goes on to allocate "regular requests" that are contained in array R. If a resource is inactive, the corresponding requests in P and R are ignored and the resource is not granted.

Appendix B illustrates an exemplary embodiment of a software prescheduler. In the software prescheduler, function conflict checks whether a request conflicts with the transfers that are already scheduled. If there is no conflict, the requested transfer is added to the list of scheduled transfers and the function returns true, otherwise, if there is a conflict, the function returns false. Function schedule continues to call function conflict by increasing the start frame of the request until the request can be scheduled or the deadline is exceeded. Conflicts are checked as follows. Given a request specified by slot s, rate r and length l, as described in Appendix B, and a scheduled transfer specified by parameters $t\hat{}.s$, $t\hat{}.r$, $t\hat{}.l$, as described in Appendix B, a a conflict arises if equation $(s+m*r=t\hat{}.s+n*t\hat{}.r)$ holds for integer numbers $m=0 \ldots l-1$ and $n=0 \ldots t\hat{}.l-1$ (where * indicates multiplication).

Appendix B illustrates only one example of many possible approaches to the prescheduling problem described herein. Algorithms to address this general type of scheduling problem are know as "earliest deadline first" or "static priority" algorithms and are well known in the art. Such algorithms can be utilized for the software prescheduler in embodiments of the invention.

Figure 15:
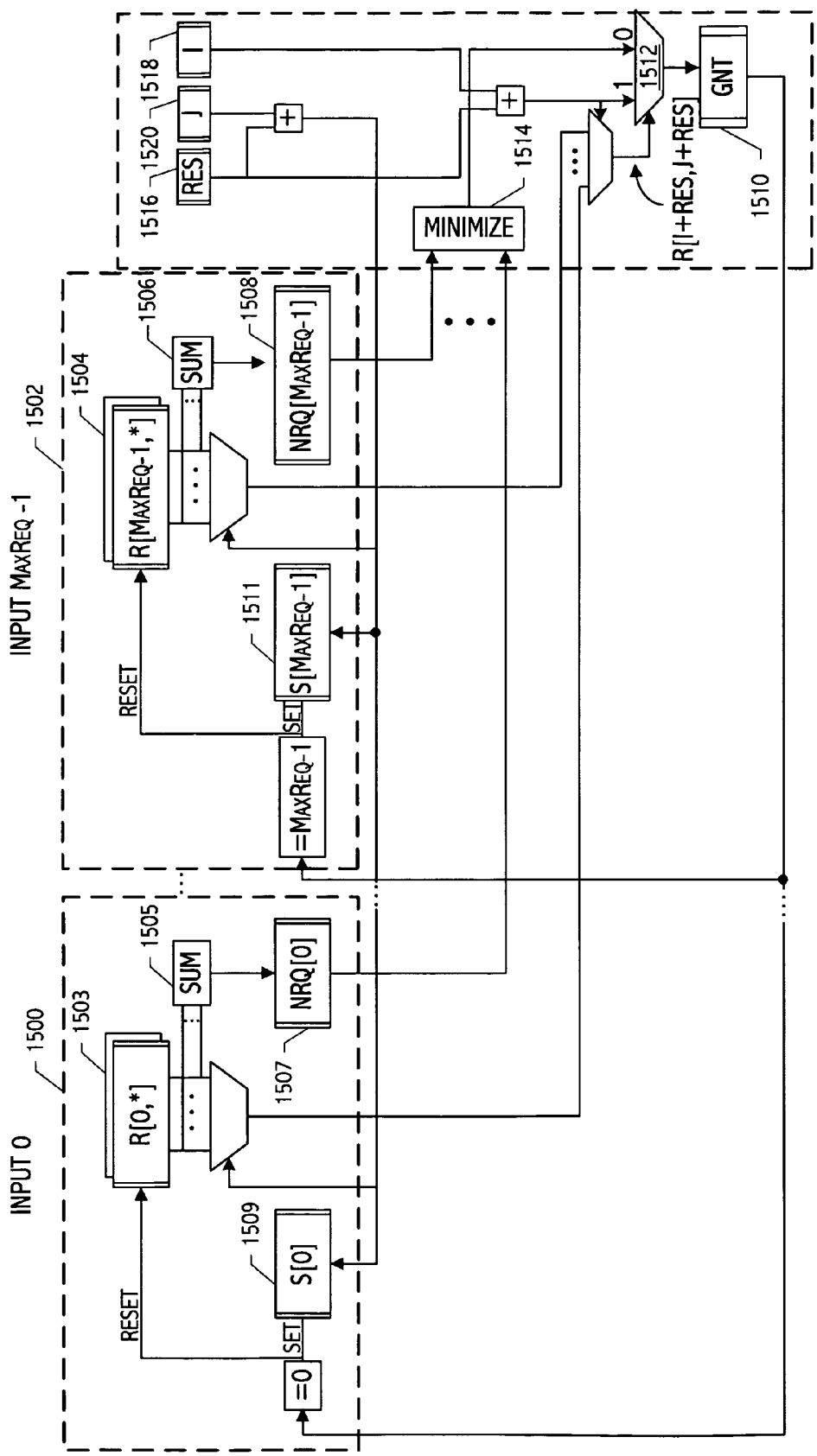
FIG. 15 illustrates a high level block diagram of an embodiment of a hardware arbiter for arbitrating regular requests.

An exemplary hardware centralized arbiter in shown in FIG. 15. Assume there are MaxReq inputs to the arbiter (i.e. MaxReq is the maximum number of requesters). FIG. 15 illustrates hardware 1500 associated with the first requester (input 0), which corresponds to requester 0 and hardware 1502 associated with the last requester (MaxReq−1). The embodiment illustrated in FIG. 15 operates as follows. Each of the elements of R[i,*], which includes elements 1503 and 1504, is initialized, where * represents the number of resources. Thus, for example, element 1503 contains all requests input by the associated requester 0 for the various resources. In addition, the array S, which includes elements 1509 and 1511 of the illustrated hardware, is reset. The requests for the illustrated elements 1503 and 1504 are summed in summers 1505, 1506 to generate a number of requests (NRQs) 1507 and 1508 for the respective requesters. If R[I+res, J+res]=1, then grant (GNT) 1510 is set to (I+res) through multiplexer 1512. That is, the round robin position is granted. Otherwise, grant (GNT) 1510 is set to the input with the minimum number of requests, which is determined in minimize circuit 1514. If there is no request for the current output, grant is set to −1 (note that the logic to set grant to −1 is assumed to be contained within grant (GNT) 1510). If grant (GNT) 1510 is not −1, then the location S[gnt] (e.g. 1509) is set to J+res, which indicates the resource granted to that requester. Each of the elements of R[gnt,*] is set to 0, where * represents the resources. The register 1516 holding "res" is incremented so res=res+1. The hardware continues the calculations for S until res=MaxRes, that is, the last resource is (J+MaxRes−1) mod MaxRes. The register 1518 containing the index I is incremented so I=I+1. If I=MaxReq, then I is set to 0 and the register 1520 containing J is incremented. The embodiment illustrated in FIG. 15 is an illustrative block diagram and does not show all the details described. As would be known to those of skill in the art, those details along with many other hardware implementations can be provided to implement the various embodiments described herein.

Figure 16:
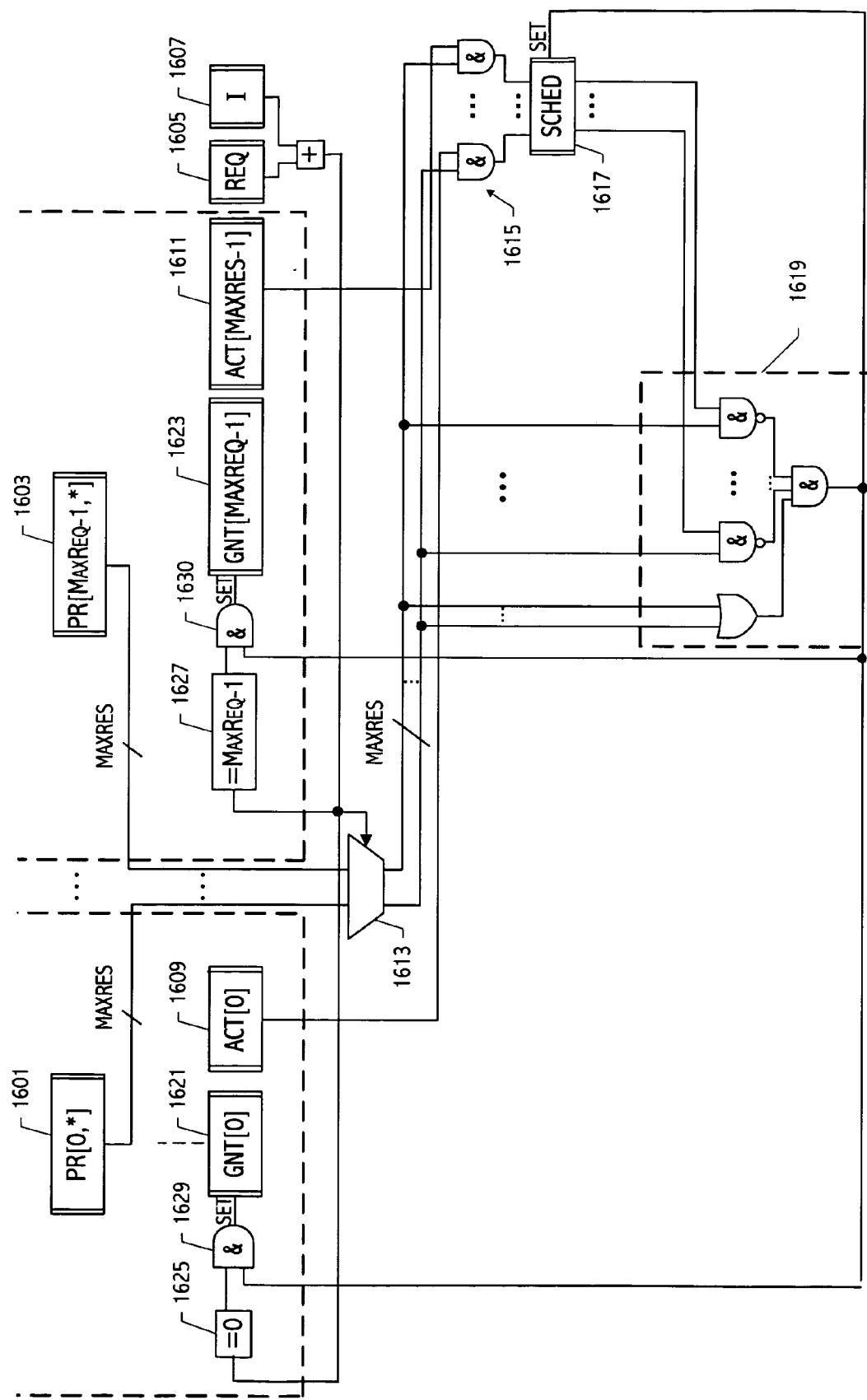
FIG. 16 illustrates a high level block diagram of an embodiment of a hardware arbiter for arbitrating prescheduled requests.

FIG. 16 illustrates an exemplary hardware arbiter for processing prescheduled requests. Registers 1601 (PR[0,*]) store prescheduled requests of requester 0, which may include requests for up to MaxRes resources as indicated by *. The requests from the intermediate requesters are not shown. The requests from the final requester (MAXREQ−1) are stored in registers 1603. Counters 1605 and 1607 indicate which request REQ is being considered along with the offset I that determines the round robin row. The ACT registers 1609 and 1611 provide an indication as to whether a particular resource is active. Based on the requester being considered provided by count registers 1605 and 1607, a particular request vector is selected by multiplexer 1613 and provided to AND gates 1615 which AND together an indication of a request for a resource and whether that resource is active. The outputs of AND gates 1615 are provided to schedule registers 1617, which store an indication of those resources that have been scheduled. If a resource has already been scheduled, the logic 1619 prevents a subsequent request for an active resource from being set in schedule register 1617. Note that in the embodiment shown, if one request of a requester is already scheduled, then all of the requests from that requester are ignored. Otherwise, the schedule register 1617 is updated by the requests of the current requester. Note that register 1617 contains sticky bits, that is, once a bit is set, it remains set until the end of the arbitration cycle.

If the requests by the requester are set in schedule registers 1617, the GNT registers 1621 and 1623 are appropriately set according to comparators 1625 and 1627. AND gates 1629 and 1630 provide the appropriate gating function to set or not set the grant registers. The embodiment illustrated in FIG. 16 is an illustrative block diagram and does not show all the details of the circuit. As would be known to those of skill in the art, those details along with many other hardware implementations can be provided to implement the various embodiments described herein.

Figure 17:
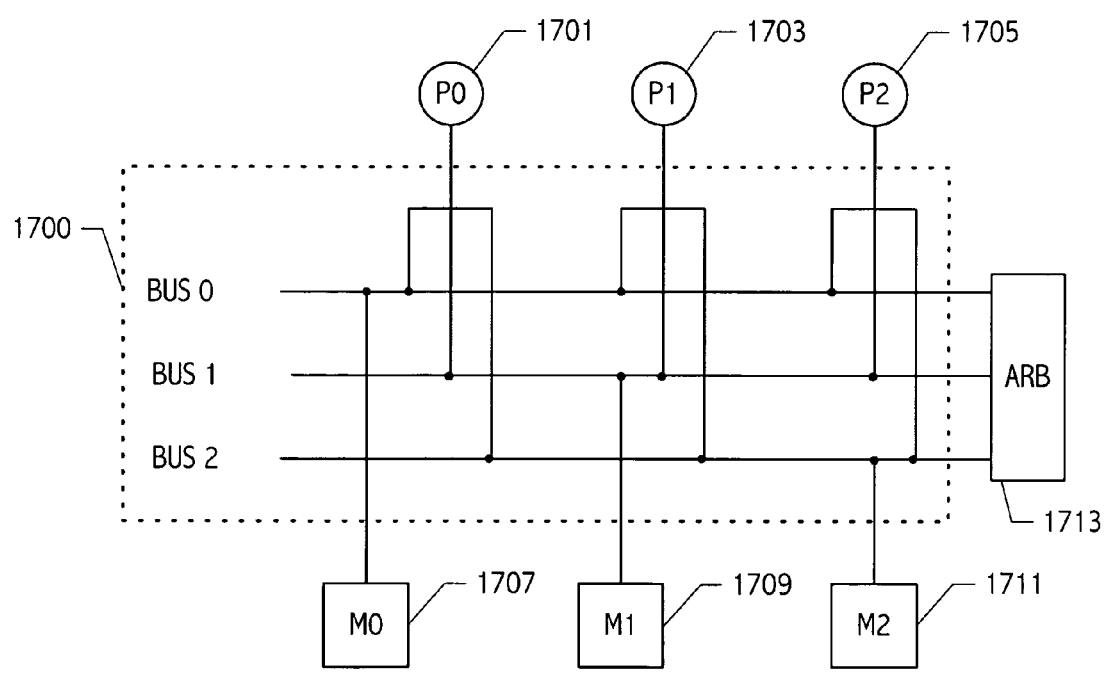
FIG. 17 illustrates a computer system having multiple processors contending for multiple memory resources, which can advantageously exploit one or more embodiments of the invention to schedule the memory resources.

Referring to FIG. 17, another embodiment of the invention is illustrated in which processors 1701, 1703, 1705 contend for access to memory resources 1707, 1709, 1711 through the buses 1700 via arbiter 1713. In certain applications, e.g., streaming video, one of the processors may wish to preschedule memory accesses to ensure the streaming video can be displayed satisfactorily. Thus, one of the processor nodes may function as a prescheduler. That node receives requests from the various nodes and generates a schedule of preallocated requests, which is supplied to the arbiter 1713. Arbiter 1713 also receives regular requests from the processor nodes for memory access and allocates memory accesses according to the prescheduled requests and the regular requests.

Thus, an approach has been described that facilitates scheduling of resources by an arbiter by providing prescheduled requests, along with regular requests. The use of prescheduling can be particularly useful where arbitration is complicated by, e.g., the periodic nature of the requests or by multicast operations.

The description of the invention set forth herein is illustrative, and is not intended to limit the scope of the invention as set forth in the following claims in which variations and modifications of the embodiments disclosed herein, may be made based on the description set forth herein, without departing from the scope and spirit of the invention as set forth in the following claims.

APPENDIX A

```
1   var
2       I: 0..MaxRq-1;                              (* round-robin requester offset *)
3       J: 0..MaxRs-1;                              (* round-robin resource offset *)
4       IP: 0..MaxRq-1;                             (* round-robin requester offset for precalculated
                                                       schedule *)
5       rq: 0..MaxRq-1;                             (* requester *)
6       rs, r: 0..MaxRs-1;                          (* resource *)
7       gnt: -1..MaxRq-1;                           (* granted request *)
8       min: 0..MaxRs+1;                            (* minimum number of requests *)
9       P: array [0..MaxRq-1, 0..MaxRs-1] of boolean;  (* P[i,j] is true if requester i has a prescheduled
                                                       connection with resource j *)
10      R: array [0..MaxRq-1, 0..MaxRs-1] of boolean;  (* R[i,j] is true if requester i is requesting resource j *)
11      Nrq: array [0..MaxRq-1] of 0..MaxRs;        (* NRq[i] is the number of resources requested by
requester i *)
12      Gnt: array [0..MaxRq-1, 0..MaxRs-1] of boolean;  (* Gnt[i,j] is true if requester i was granted resesource j *)
13      Mux: array [0..MaxRs-1] of -1..MaxRq;       (* Mux[i] contains the mux select for resource i *)
14      Act: array [0..MaxRs-1] of boolean;         (* Act[i] is true if resource i is active *)
15      ovl: boolean;                               (* ovl is true if current request overlaps with previously
                                                       scheduled ones *)
16  procedure arbitrate;
17  begin
18      for rq := 0 to MaxRq-1 do
19          for rs := 0 to MaxRs-1 do
20              Gnt[rq,rs] = false;                 (* initialize grants *)
21          for rs := 0 to MaxRs-1 do
22              Mux[rs] := -1;                      (* initialize mux selects *)
23      for rq := 0 to MaxRq-1 do                   (* check precalculated schedule *)
24      begin
25          ovl := false;
26          for rs := 0 to MaxRs-1 do               (* ignore requester if it has a preschuled connection
                                                       with a resource *)
27              if P[(rq+IP) mod MaxRq,rs] and (Mux[rs] < > -1) then    (* that has already been assigned *)
28                  ovl := true;
29          if not ovl then
```

APPENDIX A-continued

```
30              for rs := 0 to MaxRs−1 do                    (* assign requested resources *)
31                  if P[(rq+IP) mod MaxRq,rs] and Act[rs] then
32                  begin
33                      Mux[rs] := (rq+IP) mod MaxRq;
34                      Gnt[(rq+IP) mod MaxRq,rs] := true;
35                      for r := 0 to MaxRs−1 do
36                          R[(rq+IP) mod MaxRq,r] := false;
37                  end;
38      end;
39      for rq := 0 to MaxRq−1 do
40      begin
41          Nrq[rq] := 0;
42          for rs := 0 to MaxRs−1 do
43              if R[rq,rs] and Act[rs] then Nrq[rq] := Nrq[rq] + 1;   (* calculate number of requests for each
                                                                          requester *)
44      end;
45      for rs := 0 to MaxRs−1 do                            (* allocate resources one after the other *)
46          if (Mux[(J+rs) mod MaxRs] = −1) and Act[(J+rs) mod MaxRs] then   (* ignore requests for prescheduled
                                                                                or inactive resources *)
47          begin
48              gnt := −1;
49              if R[(I+rs) mod MaxRq,(J+rs) mod MaxRs] then          (* round-robin position wins *)
50                  gnt := (I+rs) mod MaxRq
51              else                                          (* find requester with smallest
                                                                 number of requests *)
52              begin
53                  min := MaxRs+1;
54                  for rq := 0 to MaxRq−1 do
55                  begin
56                      if (R[(rq+I+rs) mod MaxRq,(rs+J) mod MaxRs]) and (Nrq[(rq+I+rs) mod MaxRq] < min) then
57                      begin
58                          gnt := (rq+I+rs) mod MaxRq;
59                          min := Nrq[(rq+I+rs) mod MaxRq];
60                      end;
61                  end;
62              end;
63              if gnt < > −1 then
64              begin
65                  Mux[(rs+J) mod MaxRs] := gnt;
66                  Gnt[gnt,(rs+J) mod MaxRs] := true;
67                  for r := 0 to MaxRs−1 do R[gnt, r] := false;
68                  Nrq[gnt] := 0;
69                  for rq := 0 to MaxRq−1 do
70                      if R[rq, (rs+J) mod MaxRs] then Nrq[rq] := Nrq[rq]−1;
71              end;
72          end;
73      I := (I+1) mod MaxRq;
74      if I = 0 then J := (J+1) mod MaxRs;
75      IP := (IP+1) mod MaxRq;
76  end;
```

APPENDIX B

```
1   program scheduler(output);                    (* simple first come first serve scheduler *)
2   type
3       Tfr = record
4           s, r, l, p: integer;                  (* start, rate, length, port *)
5           nxt: TfrPtr;                          (* pointer to next transfer descriptor *)
6           end;
7       TfrPtr = ^Tfr;
8   var
9       h: TfrPtr;                                (* pointer to head of list of scheduled transfers *)
10  function conflict(s, r, l, p: integer): boolean;   (* true if transfer can be scheduled without collisions *)
11  var
12      c: boolean;                               (* true if transfers collide *)
13      t: TfrPtr;
14      m,n: integer;
15  begin
16      c := false;
17      t := h;
18      while not c and (t^.nxt < >nil) do
19      begin
20          if p = t^.p then                      (* request is competing for a scheduled output port *)
21          begin
22              if not (((s+r*(l−1)) < t^.s) or (s > (t^.s+t^.r*(t^.l−1))))    (* transfers overlap *)
                    then
```

APPENDIX B-continued

```
23              begin
24                  m := 0; n := 0;
25                  if (s>t^.s) then
26                      n := abs(s-t^.s) div t^.r
27                  else
28                      m := abs(s-t^.s) div r;
29                  while ((m<l) and (n<t^.l)) and (s+m*r < > t^.s+n*t^.r) do
30                      if s+m*r > t^.s+n*t^.r then
31                          n := n+1
32                      else
33                          m := m+1;
34                  c := ((m<l) and (n<t^.l));
35                  end;
36              end;
37              t := t^.nxt;
38          end;
39          if not c then                           (* schedule transfer *)
40          begin
41              new(t);
42              t^.s := s; t^.r := r; t^.l := l; t^.p := p; t^.nxt := h;
43              h := t;
44          end;
45          return not c;
46      end;
47      function schedule(s, r, l, d, p: integer): integer;   (* start, rate, length, deadline, port *)
48      begin
49          while s+(l-1)*r <= d do
50          begin
51              if conflict(s, r, l, p) then
52                  return s
53              else
54                  s := s+1;
55          end;
56          return -1;
57      end;
58      begin
59          new(h); h^.nxt := nil;                  (* dummy element *)
60      end.
```

What is claimed is:

1. A method for allocating a plurality of resources in an electronic system, comprising:
   allocating a first group of one or more of the resources in accordance with first requests for the resources, the first group being allocated for a particular time period;
   subsequently allocating a second group of one or more of the resources for the particular time period in accordance with regular requests, and
   receiving the first requests for the first group of resources in a centralized scheduler, the centralized scheduler residing in one of a plurality of requesters on the communication network; and
   receiving the regular requests at a centralized arbiter separate from the centralized scheduler,
   wherein the resources requested comprise data paths through a communication network, the data paths coupling initiator nodes of the network to target nodes of the network.

2. The method as recited in claim 1 wherein the first requests include requests for one or more resources on a periodic basis.

3. The method as recited in claim 2 wherein the first requests for one or more resources on a periodic basis are for transfer of at least one of multicast data and isochronous data.

4. The method as recited in claim 2 wherein the regular requests include non-periodic data.

5. The method as recited in claim 1 wherein the first requests are for transfer of at least one of multicast data and isochronous data.

6. A network system comprising:
   a data transport medium attached to a plurality of sources and a plurality of targets;
   an arbiter coupled to receive first requests for transfers from one or more of the sources to one or more of the targets during a time slot on the data transport medium and coupled to receive regular requests from the sources for transfers from one or more of the sources to one or more of the targets during the time slot, the arbiter allocating the targets to the sources in accordance with the first requests and then in accordance with the regular requests; and
   a centralized scheduler residing in one of the plurality of sources, the centralized scheduler coupled to receive the first requests for transfers; and
   wherein the arbiter is centralized and separate from the centralized scheduler.

7. The network system as recited in claim 6 wherein the first requests are supplied to the arbiter as a precalculated schedule.

8. The network system as recited in claim 7 wherein the precalculated schedule supplied to the arbiter is always conflict free.

9. The network system as recited in claim 7 wherein the centralized scheduler is responsive to preallocation requests for pre-allocated slots on the data transport medium to generate the precalculated schedule for the preallocation requests.

10. The network system as recited in claim 9 wherein the centralized scheduler is implemented as a software executable on the one of the plurality of sources.

11. The network system as recited in claim 7 wherein the precalculated schedule includes a scheduled transfer of isochronous traffic.

12. The network system as recited in claim 11 wherein the precalculated schedule includes a scheduled transfer of periodic traffic.

13. The network system as recited in claim 7 wherein the precalculated schedule includes a scheduled transfer of multicast data in which the data is transferred from a single source to a plurality of targets.

14. The network system as recited in claim 13 wherein the multicast data is part of a scheduled periodic multicast transfer.

15. The network system as recited in claim 6 wherein the transport medium includes a synchronous switch.

16. The network system as recited in claim 6 wherein the arbiter receives preallocation requests for pre-allocated slots and regular requests for slots on the data transport medium, the arbiter giving priority to preallocation requests in allocating resources.

17. The network system as recited in claim 16 wherein the arbiter receives a vector including the preallocated requests and the regular requests from the sources on the network.

18. The network system as recited in claim 17 wherein the sources receive the preallocated requests from the centralized scheduler of the preallocated requests.

19. An arbitration apparatus for arbitrating requests from a plurality of requesters for a plurality of resources, comprising:
    means for receiving regular requests for resources from the requesters;
    means for receiving a precalculated schedule;
    means for allocating resources by allocating during a first arbitration phase requests for the resources based on the precalculated schedule and allocating during a second arbitration phase the regular requests for the resources; and
    wherein the resources requested comprise data paths through a communication network, the data paths coupling initiator nodes of the network to target nodes of the network;
    wherein the means for allocating includes a centralized scheduler residing in one of the plurality of requesters, the centralized scheduler coupled to receive the first requests for transfers; and
    wherein the means for allocating includes a centralized arbiter separate from the centralized scheduler.

20. The arbitration apparatus as recited in claim 19 wherein the data path comprises a network switch.

21. A method for allocating a plurality of resources in a communication network, comprising:
    during a first arbitration phase, reserving a first portion of the resources for a particular time period on the network in response to requests for scheduled transfers;
    during a second arbitration phase allocating a second portion of the resources in response to regular requests; and
    transferring data across the communication network according to the allocating of resources;
    wherein the resources are slots in the communication network connecting an input port to one or more output ports in a network switch;
    wherein the first portion is reserved in a scheduler separate from an arbiter, the arbiter allocating the second portion, the scheduler providing a schedule to the arbiter indicating the reserved first portion.

22. The method as recited in claim 21 wherein the schedule is guaranteed not to have conflicts.

23. The method as recited in claim 21 wherein the schedule has conflicts in requests for the first portion of resources.

24. The method as recited in claim 21 wherein the regular requests are for resources during a single slot in the communication network and wherein the requests for scheduled transfers include requests for periodic slots on the network.

25. The method as recited in claim 24 wherein the requests for periodic slots are for transfer of at least one of multicast data and isochronous data.

26. The method as recited in claim 24 wherein the first portion of the resources reserved are for transferring at least one of multicast data and isochronous data across the communication network.

27. A method for allocating a plurality of resources in an electronic system, comprising:
    allocating a first group of one or more of the resources in accordance with first requests for the resources, the first group being allocated for a particular time period;
    subsequently allocating a second group of one or more of the resources for the particular time period in accordance with second requests; and
    wherein the resources requested comprise data paths through a communication network, the data paths coupling initiator nodes of the network to target nodes of the network;
    receiving the first requests for the first group of resources in a centralized scheduler, the centralized scheduler residing in one of a plurality of requesters on the communication network; and
    receiving the second requests at a centralized arbiter separate from the centralized scheduler.

28. The method as recited in claim 27 wherein the first requests include requests for one or more resources on a periodic basis and the second requests include non-periodic data.

29. The method as recited in claim 27 wherein the first requests are for transfer of at least one of multicast data and isochronous data.

30. A network system comprising:
    a data transport medium attached to a plurality of sources and a plurality of targets;
    an arbiter coupled to receive first requests for transfers from one or more of the sources to one or more of the targets during a time slot on the data transport medium and coupled to receive second requests from the sources for transfers from one or more of the sources to one or more of the targets during the time slot, the arbiter allocating the targets to the sources in accordance with the first requests and then in accordance with the second requests;
    a centralized scheduler residing in one of the plurality of sources, the centralized scheduler coupled to receive the first requests for transfers; and
    wherein the arbiter is centralized and separate from the centralized scheduler.

31. The network system as recited in claim 30 wherein the first requests are supplied to the arbiter as a precalculated schedule.

32. The network system as recited in claim 31 wherein the centralized scheduler is responsive to preallocation requests for pre-allocated slots on the data transport medium to generate the precalculated schedule for the preallocation requests.

33. A method for allocating a plurality of data paths through a switch in an electronic system comprising:

preallocating for a time period, a first group of a plurality of data paths through a switch in response to corresponding periodic requests from at least one initiator node of a network for connection to at least one corresponding target node of the network; and allocating for the time period, a second group of the plurality of data paths through the switch in response to corresponding non-periodic requests from at least one initiator node of the network for connection to at least one corresponding target node of the network;

receiving the periodic requests for the first group of data paths in a centralized scheduler, the centralized scheduler residing in one of a plurality of initiator nodes on the communication network; and receiving the non-periodic requests at a centralized arbiter separate from the centralized scheduler;

wherein the data paths couple input ports of the switch to output ports of the switch, the initiator nodes being coupled to respective input ports of the switch and the target nodes being coupled to respective output ports of the switch.

* * * * *